June 5, 1962 — R. E. TUFT — 3,037,741
DAMPING TURBINE BUCKETS
Filed Dec. 29, 1958
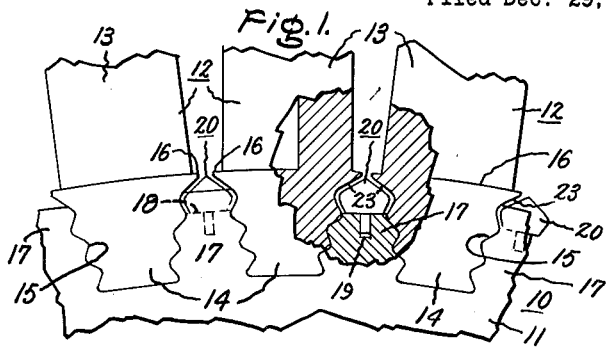
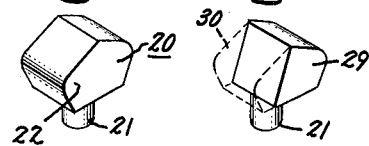
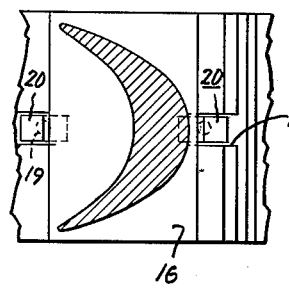
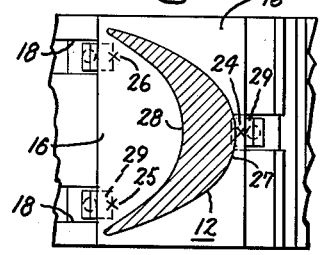
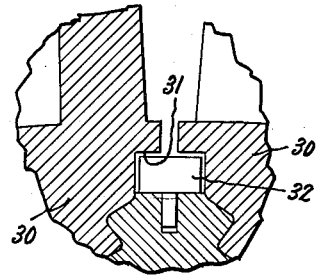
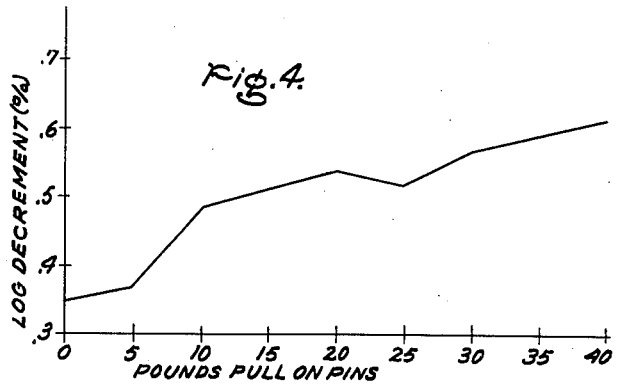
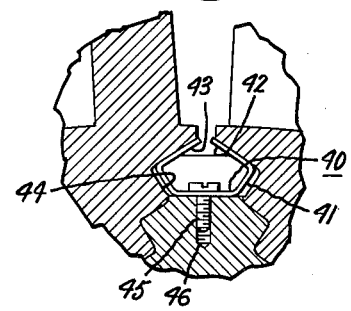
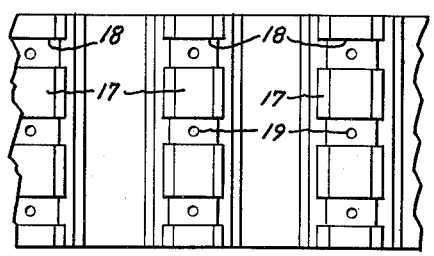
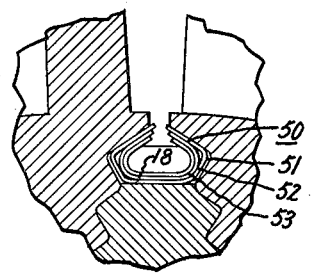
Inventor:
Roy E. Tuft,
by Joseph T. Cohen
His Attorney.

United States Patent Office 3,037,741
Patented June 5, 1962

3,037,741
DAMPING TURBINE BUCKETS
Roy E. Tuft, Guilderland Center, N.Y., assignor to General Electric Company, a corporation of New York
Filed Dec. 29, 1958, Ser. No. 783,469
7 Claims. (Cl. 253—77)

This invention relates to fluid turbines and more specifically to the vibration damping of buckets used in gas turbines. This application is a continuation-in-part of application Serial No. 401,251, R. E. Tuft, filed December 30, 1953, assigned to the same assignee as the present application, and now abandoned.

In gas turbine operation, there is a tendency of the turbine buckets to fracture when subjected to a vibrational stress at or near resonant frequency. In many installations, gas turbines are operated under conditions of frequent acceleration and deceleration and it is during acceleration or deceleration of the gas turbine that the buckets are, momentarily at least, subjected to vibrational stresses, at their fundamental resonant frequency, and at secondary or even higher resonant frequencies. When a turbine bucket is subjected to a vibrational stress at or near its resonant frequency, its amplitude of vibration can readily increase to a degree where fatigue fractures occur. Such fractures have occurred in the very tough and heat-stable metals or alloys from which present turbine blades are fabricated.

The buckets which are most prone to fracture are those which are rigidly positioned in the turbine disk or wheel. In most instances, the presence of a slight fracture caused by vibration results in a damping effect which aids in safeguarding the blade from further vibrational deterioration. However, the protection afforded by the damping effect of the fracture does not prevent further slow progress of the fracture, and it is not unusual for a portion of a turbine bucket to be broken off entirely. This condition decreases the efficiency of energy conversion and unbalances the turbine disk or wheel thereby increasing vibration. The desirability of damping turbine buckets to resist the fracturing effect of a vibrational stress at or near the resonant frequency vibration of the bucket is obvious.

Accordingly, it is an object of this invention to provide a turbine wheel and bucket assembly which will resist fracture of the buckets when a vibrational stress is applied thereto.

It is another object of this invention to provide a new and improved turbine bucket assembly for use in fluid turbines.

It is a further object of the invention to provide a turbine wheel and bucket assembly which utilizes frictional forces to achieve damping.

It is another object of this invention to provide vibration damping of turbine buckets by vibration damping members acting on the bucket bases.

It is also another object of this invention to provide preferred positions for vibration damping members acting on turbine bucket bases.

Briefly stated, in accordance with one of its aspects, this invention comprises a turbine wheel and bucket assembly wherein loose-fitting or resilient members are retained in provided openings between bucket bases so that these members will frictionally engage or rub against the lower surfaces of the bucket platforms.

These and various other objects, features and advantages of the invention will be better understood from the following description taken in connection with the accompanying drawing in which:

FIG. 1 is a partial sectional view of an embodiment of my invention implied to a turbine wheel and bucket assembly.

FIG. 2 is a developed top plan view of the wheel shown in FIG. 1.

FIG. 3 is a preferred arrangement of the position of the damping members of this invention.

FIG. 4 is a curve illustrating the damping characteristics obtained by the teachings of this invention.

FIG. 5 is a developed top plan view of a modified turbine wheel and bucket assembly.

FIG. 6 is a perspective view of the damping pin member shown in FIG. 1.

FIG. 7 is a perspective view of a modified damping pin member.

FIG. 8 is a partial sectional view of a modified form of a turbine wheel, bucket and pin member assembly.

FIG. 9 is a partial sectional view of a further modified form of a turbine wheel, bucket and pin member assembly.

FIG. 10 is a partial sectional view of a modified form of the pin member of FIG. 9.

Referring now to FIG. 1, there is illustrated a turbine wheel and bucket or blade assembly 10 which can be used in fluid turbine applications. Assembly 10 comprises a rotor or turbine disk or wheel 11 having a plurality of blades or buckets 12 mounted in uniform spacing around the periphery thereof. Each of the blades 12 consists of an elongated body 13 contoured to convert a portion of the kinetic energy of a passing fluid stream to rotational mechanical energy, and suitably attached to or integral with a base 14. While base 14 is illustrated as the well known dovetail or fir tree type of base mounting, other forms of bases or mountings may also be employed within the scope of this invention, for example, pin mounting, hook-on type, etc., to mate or fit with a corresponding wheel mounting, for example, the dovetail base opening or serrated slot 15 of FIG. 1. Slots 15 are broached, cut, or otherwise formed in wheel 11 at the periphery thereof and in a generally transverse direction to the plane of the wheel. The juncture of base 14 and blade body 13 defines a smooth relatively thin platform surface 16, which, when a plurality of blades are positioned along the periphery of wheel 11, define a lower generally continuous surface for the flow of a passing fluid stream. Since tne serrated slots 15 are formed in the wheel at spaced apart locations along the periphery thereof, each pair of slots is separated by the remaining rim structure indicated as projections 17, these projections 17 also being by definition generally transverse to the plane of the wheel.

In the top or peripheral surface of rim projections 17, a slot 18 is provided which progresses generally in a peripheral direction and which extends somewhate under adjacent platforms 16 of adjacent blades 12. It is to be noted that adjacent platforms 16 do not abut each other so that an intervening space is provided for relative movement of platforms 16. There is also provided in the base of the slot 18 a hole 19 which extends radially into the wheel 11.

A loose fitting member, for example, a pin 20 (FIG. 6) having a shaft 21 and a head 22 is positioned in the hole 19 and the slot 18. Loose fitting is intended to mean that the shaft 21 and the head 22 of pin 20 have a relatively sliding fit with hole 19 and the walls of the slot 18, respectively. Hole 19 which receives shaft 21 is the retaining means employed to prevent axial movement of pin 20. It is understood that other retaining arrangements may be so employed within the scope of this invention. Turbine buckets 12 are axially inserted in rotor 11 by means of their base mountings 14 in wheel slots 15 in the conventional manner.

In operation, during rotation of the turbine wheel 11, the loose fitting pins 20, due to the centrifugal forces imposed, will engage and rub against the lower surface 23 of bucket platforms 16, while at the same time being in engagement with the wheel. If bucket bases 14 were retained tightly by tangential forces while the rotor is revolving, and not permitted to move, the platform 16 of each of the buckets 12 would still have some movement since the platforms are slightly above the circumference of the wheel rim and bending may take place within bases 14. Pins 20 would engage platforms 16 and damp the vibration of buckets 12. Alternatively, the buckets as illustrated in FIG. 1 are generally not retained tightly within the disk 11 and relative movement is permitted between slots 15 and bucket bases 14. When buckets 12, such as those illustrated in FIG. 1, are subjected to a vibrational stress, the loose-fitting pins 20 engage and rub against the lower surfaces 23 of adjoining platforms 16 to damp the vibrations of the turbine buckets 12. These frictional forces not only tend to damp the vibrations but also limit the maximum amplitude thereof.

FIG. 3 discloses a preferred arrangement of pins 20 of this invention when employed to dampen the vibrations of a bucket configuration as illustrated, i.e., where the blade section 12 adjoins a platform 16 which is immediately adjacent base mounting 14 with no intervening structure. Best results are attained by the teachings of this invention when applied to this type of bucket. It has been discovered, in this bucket configuration 12, that maximum amplitude of vibration and maximum forces are imposed at particular locations. In FIG. 3, for example, when bucket 12 moves to the left, the maximum force and vibration is imposed at a point or limited area 24, and, during movement to the right, the maximum force and vibration is imposed at points or areas 25 and 26. Most vibration failures are indicated by cracks forming at the areas of the blade adjacent these points. Accordingly, maximum vibration damping may be obtained if the damping is concentrated adjacent these points. One method of concentrating the vibration damping includes, as illustrated for example, a single pin member 20 at point 24, at the leading edge or surface 27 of blade 12 and platform 16, and a pin member 20 at each of the points 25 and 26 at the trailing edge or surface 28 of the platforms 16. The leading edge of the platform is that edge on the convex side of the blade and the trailing edge is the edge along the concave side of the blade. It should also be noted that the rubbing or engaged area of the pins 20 is close to the upper surface of platform 16 and should be so positioned when large depth or blocklike platforms are employed.

The pin members of FIG. 3 may be those illustrated in FIG. 1 or FIG. 6 with the preferred positioning being obtained by suitably positioned openings 18. However, a modified pin 29, as employed in FIG. 3, and more clearly illustrated in FIG. 7 as a pin member 20 having a removed or cut away portion 30, is preferred as permitting more convenient forming of openings 18. Pin members 29 engage one platform only.

The results of a test performed with the pin member 29 (FIG. 7) and the blades 12 (FIG. 1) with the preferred location as illustrated in FIG. 3 is shown in FIG. 4. During the test, the tangential forces exerted between the bucket bases, and the mating slots, was constant. Upward forces on pins 29, equivalent to imposed centrifugal forces of a rotating wheel, were applied by upwardly extending tensioned wires welded to heads 22. The blades were then vibrated by a high velocity air stream. It can be seen by FIG. 4 that increased forces, similar to those imposed by centrifugal forces of a rotating wheel definitely increased the log decrement of damping indicating that good vibration damping characteristics were obtained by the teachings of this invention.

A modification of the invention illustrated in FIG. 3 is shown in FIG. 5. In FIG. 5 each of the rim projections 17 are provided with plural openings or slots 18, for example three, spaced along the lengths thereof. The preferred arrangement of FIG. 3 of this invention may be incorporated into the modification of FIG. 5 by utilizing pins 29, such pins then being placed in slots 18 of FIG. 5 so that three point engagement is provided for each platform. However, a desirable embodiment closely approaching the preferred is obtained when pins 20 as illustrated in FIGS. 1 and 6 are utilized in each of slots 18 so that the three point bearing arrangement is also included.

The holes 19 could also be eliminated in any of the described figures of this invention; thus, leaving only slots 18 for the insertion of damping members with head portions only and other suitable retaining means employed.

FIG. 8 is another modified form of this invention where both slots and pins are alternate forms. In FIG. 8 the adjacent bases 30 are formed to provide a suitable opening 31 defined therebetween while an alternate form of flatheaded pin member 32 is employed as the damping member. It is thus to be understood that various slot or opening configurations together with various pin member configurations may be employed within the scope of this invention.

FIG. 9 is another modified form of damping pin illustrated as 40 which comprises a strip of resilient material such as a metallic spring 41 having its free ends 42 and 43 bent towards each other. The spring member 41 is positioned within a slot 44 similar to slot 18 of FIG. 1 such that the free ends or arms 42 and 43 exert a biasing force against the adjacent platforms 16 to bias the blades in a peripheral and radial direction. Various arrangements may be employed to secure the strip 41 to disk 11. In one form of this invention as illustrated, a threaded member 45 passes through a suitable opening in strip 41 to threadedly engage with mating threads 46 in disk 11.

FIG. 10 illustrates a further modified form of damping member 50 similar to member 40 as illustrated in FIG. 9. Member 50 is shown as positioned for use in slot 18 as disclosed in FIGS. 1, 2, 3, 5 and 8 and preferably comprises a plurality of concentric strips of resilient material such as metallic springs 51, 52 and 53. These spring members also provide biasing forces as described for FIG. 9.

As will be apparent to those skilled in the art, the objects of my invention are attained by the use of a plurality of loose-fitting members provided between adjoining disk dovetails generally at preferred locations to engage the lower surface of adjoining bucket platforms to damp the vibrations of the turbine buckets. The pin members are best described as non-locking pins as they do not tightly retain the buckets, but damp vibrations by rubbing friction with the buckets.

While other modifications of this invention and variations of apparatus which may be employed within the scope of the invention have not been described, the invention is intended to include all such as may be embraced within the following claims.

What I claim as new and desire to secure by Letters Patent of the United States is:

1. A turbine wheel assembly comprising in combination, a turbine wheel, a plurality of buckets positioned on the periphery of said wheel, said buckets including a blade portion, a base or mounting portion, and an intermediate defined platform all in adjacent contiguous relationship, said wheel having spaced apart slot openings in the periphery thereof to receive said bases, said spaced apart openings being defined by intermediate radial rim projections, said radial rim projections having an opening in the top surface thereof centrally of the transverse dimension, said bucket platforms being closely adjacent and partly overlying said radial rim projection opening, and a loose fitting vibration damping member in each of said radial rim projection openings and engaging said wheel and said bucket during rotation of said wheel, said pin adapted to engage pairs of overlying bucket platforms only at a central portion of the transverse dimension to dampen vibration by rubbing friction.

2. Vibration damping means for fluid turbines comprising in combination a turbine wheel, a plurality of turbine buckets positioned along the periphery of said wheel, each of said buckets having a platform thereon spaced from the platform of an adjacent bucket and having leading and trailing edges and damping means beneath said platforms and engaging said wheel, said damping means including means operative by rotation of said wheel for engaging said platforms at a sole position at the leading edge thereof and means engaging said platforms at plural spaced apart positions along the trailing edge thereof.

3. The invention as claimed in claim 2 wherein said damping means are loose fitting pin members adapted to engage the platforms during rotation of said wheel for rubbing friction vibration damping.

4. The invention as described in claim 2 wherein said vibration damping means are spring members biasing said blades in a radial and peripheral direction.

5. The invention as described in claim 4 wherein said spring members include a plurality of curved metal spring strips in concentric relationship.

6. A turbine wheel assembly comprising in combination, a turbine wheel, a plurality of buckets positioned on the periphery of said wheel, said buckets including a blade portion, a base or mounting portion, and an intermediate defined platform all in adjacent contiguous relationship, said wheel having spaced apart slot openings in the periphery thereof to receive said bases, said spaced apart openings being defined by intermediate radial rim projections, said radial rim projections having a plurality of spaced apart openings in the top surface transversely thereof, said bucket platforms being closely adjacent to and partly overlying said radial rim projection openings, and a loose fitting vibration damping member in each of said radial rim projection openings and engaging said wheel and adapted to engage said bucket platforms during rotation of said wheel to dampen vibration by rubbing friction.

7. A turbine wheel assembly comprising in combination, a turbine wheel, a plurality of buckets positioned on the periphery of said wheel, said buckets including a blade portion, a base or mounting portion, and an intermediate defined platform all in adjacent contiguous relationship, said wheel having spaced apart slot openings in the periphery thereof to receive said bases, said spaced apart openings being defined by an intermediate radial rim projection, said radial rim projections having a plurality of spaced apart openings in the top surface transversely thereof, said bucket platforms being closely adjacent to and partly overlying said radial rim projection openings, and a loose fitting vibration damping member in each of said radial rim projection openings and engaging said wheel and adapted to engage said bucket platforms during rotation of said wheel to dampen vibration by rubbing friction, said vibration damping members engaging each bucket platform at a single central position at the leading edge of the platform and a pair of spaced apart positions at the trailing edge.

References Cited in the file of this patent

UNITED STATES PATENTS

| 1,856,786 | Rice | May 3, 1932 |
| 2,310,412 | Flanders | Feb. 9, 1943 |
| 2,349,187 | Meyer | May 16, 1944 |
| 2,997,274 | Hanson | Aug. 22, 1961 |

FOREIGN PATENTS

| 652,099 | Great Britain | Apr. 18, 1951 |
| 670,665 | Great Britain | Apr. 23, 1956 |
| 671,960 | Great Britain | May 14, 1952 |
| 812,337 | Germany | Aug. 27, 1951 |
| 841,664 | Germany | June 19, 1952 |